(12) United States Patent
Matsumoto et al.

(10) Patent No.: US 7,174,493 B2
(45) Date of Patent: Feb. 6, 2007

(54) RECEPTION APPARATUS AND RECEPTION METHOD

(75) Inventors: Atsushi Matsumoto, Kanazawa (JP); Sadaki Futagi, Ishikawa-gun (JP); Kenichi Miyoshi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 254 days.

(21) Appl. No.: 10/477,142

(22) PCT Filed: Mar. 14, 2003

(86) PCT No.: PCT/JP03/03057

§ 371 (c)(1),
(2), (4) Date: Nov. 7, 2003

(87) PCT Pub. No.: WO03/077462

PCT Pub. Date: Sep. 18, 2003

(65) Prior Publication Data

US 2004/0148552 A1   Jul. 29, 2004

(30) Foreign Application Priority Data

Mar. 14, 2002   (JP)   .............................. 2002-70866

(51) Int. Cl.
*G08C 25/02*   (2006.01)

(52) U.S. Cl. ........................ 714/748; 714/749; 714/751

(58) Field of Classification Search ...................... None
See application file for complete search history.

(56) References Cited

U.S. PATENT DOCUMENTS 6,247,150 B1   6/2001   Niemela 6,308,294 B1 *   10/2001   Ghosh et al. ................ 714/751
6,445,717 B1 *   9/2002   Gibson et al. .............. 370/473

FOREIGN PATENT DOCUMENTS

| JP | 1175055 | 3/1999 |
| JP | 2001-60934 | * 3/2001 |
| JP | 200160934 | 3/2001 |
| JP | 2001197044 | 7/2001 |
| JP | 2002520904 | 7/2002 |

OTHER PUBLICATIONS

International Search Report dated May 20, 2003.

* cited by examiner

*Primary Examiner*—Albert Decady
*Assistant Examiner*—Steve Nguyen
(74) *Attorney, Agent, or Firm*—Stevens, Davis, Miller & Mosher, LLP

(57) ABSTRACT

Receiving a packet interleaved with an interleave pattern corresponding to the number of times of retransmission, reception apparatus (200) de-interleaves a pilot sequence contained in the packet with de-interleavers (205-1~205-N). Correlators (206-1~206-N) performs correlation calculation between the de-interleaved pilot sequence and a pilot pattern held in the reception apparatus. Maximum value detection section (207) detects the maximum correlation value among the correlation values to detect the number of times of retransmission. Decision section (209) controls combination circuit (213) and error detection section (217) based on the number of times of retransmission stored in storage section (208) and on the number of times of retransmission detected at maximum value detection section (207). This allows a decrease in throughput to be prevented from occurring even in a case where a reception side receives a packet which is different from one which is requested by the reception side.

6 Claims, 6 Drawing Sheets

RECEPTION APPARATUS AND RECEPTION METHOD

FIELD OF THE INVENTION

The present invention relates to a reception apparatus and a reception method for performing an error control in data transmission with the issuance of an automatic repeat request.

BACKGROUND ART

In wireless communications, error control techniques for correcting errors not recovered with the use of an equalization technique or a diversity technique, etc., are popularly used for achieving a high-quality transmission. Among such error control techniques is an Automatic Repeat Request (ARQ: hereafter referred to as "ARQ").

In the ARQ, in which a transmission side and a reception side is connected via a two-way transmission path, the transmission side sends a packet containing a codeword generated by performing an error detection encoding processing on information bits to the reception side, and the reception side then performs an error detection. In a case where no error is detected in the received data, the reception side returns a reception acknowledgement signal notifying that reception is done correctly (Positive Acknowledgement: hereafter referred to as "ACK"), whereas in a case where an error is detected in the received data, the reception side returns a retransmission request signal (Negative Acknowledgement: hereafter referred to as "NACK"). Upon reception of a NACK, the transmission side retransmits the identical packet. Until receiving an ACK, the transmission side repeats retransmission of the identical packet.

An explanation is given here with an example of a case where information bits subjected to blocking processing are sequentially transmitted in a packetized composition. First of all, a transmission side transmits the $1^{st}$ packet M to a reception side, and upon correct reception of a codeword contained in the $1^{st}$ packet, the reception side sends an ACK to the transmission side. Receiving the ACK, the transmission side sends the next $2^{nd}$ packet M+1 to the reception side. Next, receiving the $2^{nd}$ packet M+1 incorrectly, the reception side sends a NACK to the transmission side. Receiving the NACK from the reception side, the transmission side resends the $2^{nd}$ packet M+1 to the reception side (repeat transmission). That is, until receiving an ACK from the reception side, the transmission side continues to transmit the packet M+1, which is the same packet as one transmitted in the last attempt for transmission, without going on to send the next new $3^{rd}$ packet M+2. In this manner, a high-quality transmission is achieved in the ARQ.

Though a high-quality transmission is achieved in the ARQ described above, this technique could sometime cause a transmission delay due to repetitive retransmission. Especially under a poor propagation environment, a high data error rate will inevitably increase the number of times of retransmissions, resulting in a sharp increase in a propagation delay. These days, active study efforts have been directed to a hybrid ARQ as a technique for dealing with a problem of the propagation delay in the ARQ. The hybrid ARQ is a scheme which incorporates an error correction coding technique into the ARQ, aiming for a decreased number of retransmission times and for a consequentially improved throughput, achieved by enhancing the error rate of a reception signal using an error correction technique.

Among hybrid ARQ schemes as described above is a Packet Combining type hybrid ARQ technique. According to the Packet Combining type hybrid ARQ, a transmission side retransmits a packet M, which is identical to its last transmission packet, that is, the packet M. Upon reception of the retransmitted packet M, a reception side performs a combination processing of a codeword (systematic bits and parity bits) contained in the packet M received in the last transmission and before the last combined with a codeword (systematic bits and parity bits) contained in the packet M received in the current transmission, and then performs an error correction decoding on the combined signal. In this way, according to the Packet Combining type hybrid ARQ, the reception level is enhanced by combining the codeword contained in the packet M received in the last transmission and before the last transmission with the codeword contained in the packet M received in the current transmission, and therefore, the error rate in a reception signal is improved as retransmission is repeated. This makes it possible to receive a reception signal without errors in a lesser number of retransmission attempts than in that of an ARQ without error correction, which makes it further possible to enhance throughput.

However, in the above-described hybrid ARQ technique, there may be a case where an ACK or a NACK reaches erroneously to the reception side due to degradation in its propagation environment, where in such a situation, the transmission side may transmits a packet which is not what the reception side demands. More specifically, when an error is detected in the packet M at the reception side, and accordingly, when a NACK message is transmitted to the transmission side, the transmission side may, notwithstanding the transmission of the NACK, recognize it erroneously as an ACK, where in such a case, the transmission side goes ahead to transmit the next packet M+1. Having requested retransmission, the reception side demands and expects the last transmission packet M which is supposed to be subjected to packet combination. Consequently, a combination of packets different from each other (packet M and packet M+1) is performed at the reception side, which defeats the purpose of enhancing the reception level by the combination, producing a quite reverse effect. On the other hand, when an error is not detected in the decoded data of the packet M at the reception side, and accordingly, when an ACK message is transmitted to the transmission side, the transmission side may, nevertheless, recognize it erroneously as a NACK, where in such a case the transmission side retransmits the last transmission packet M. Having transmitted a reception acknowledgement signal ACK, the reception side demands and expects the next transmission packet M+1. Due to the retransmission, though the reception side has already acquired data decoded with no error detected thereon, the reception side ends up decoding the retransmitted data which is identical to the already-acquired data. As its result, a problem of a significant decrease in throughput arises.

As one of prevention measures against such an erroneous combination, it is conceivable to make a judgment at the reception side as to whether the received signal is the demand one or not, where the judgment is made based on control data affixed to the packet. However, it is not possible to recognize the control data until decoding processing is performed at the reception side, causing a problem of increased processing load and of a longer processing delay.

DESCRIPTION OF THE INVENTION

It is an object of the present invention to provide a reception apparatus and a reception method in data communications employing a hybrid ARQ which makes it possible to prevent a decrease in throughput from occurring even when a packet which is different from the packet requested by a reception side is received.

The theme of the present invention lies in that a reception apparatus knows the current number of times of transmission of a packet, which is achieved by providing a plurality of interleave patterns corresponding to number of times of transmissions both for a transmission apparatus and the reception apparatus, by having the transmission apparatus perform interleaving processing on its pilot sequence using a predetermined interleave pattern associated with the current number of times of transmission of the packet, and by having the reception apparatus perform de-interleaving processing on the interleaved pilot sequence using all interleave patterns to learn the current number of times of transmission of the packet based on the de-interleaved pilot sequence.

In addition, it is another object of the present invention to prevent current reception data from being combined with combination data of the last reception data and therebefore, or to prevent decoding thereof from being performed. This allows a decrease in throughput to be prevented from occurring even in a case where a reception apparatus receives a packet which is different from one which is requested by the reception apparatus.

BEST MODE FOR CARRYING OUT THE INVENTION

Embodiments of the present invention will be described below with reference to the accompanying drawings.

(Embodiment)

Figure 1:
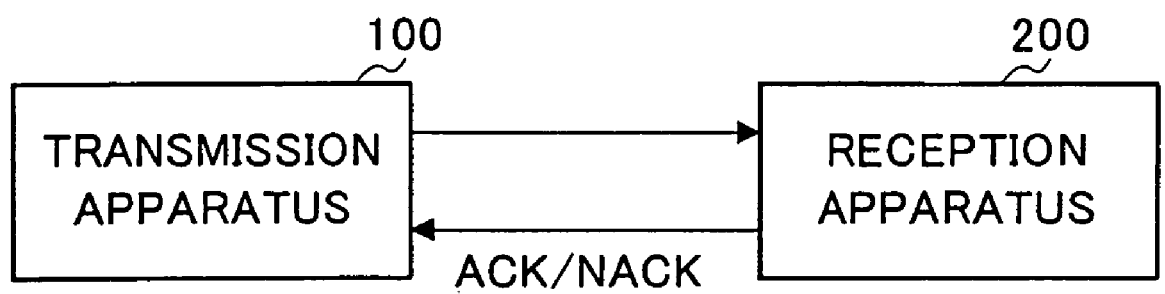
FIG. 1 is a diagram illustrating the rough configuration of a data transmission system according to an embodiment of the present invention.

FIG. 1 is a diagram illustrating the rough configuration of a data transmission system according to an embodiment of the present invention. As illustrated in this figure, transmission apparatus 100 is connected with reception apparatus 200 via a two-way transmission path. Transmission apparatus 100 generates a packet with a protocol header affixed thereto, and sends the generated packet to reception apparatus 200. It is noted that a packet is one example of data transmission units, and it is possible to cite a frame, a super-frame, and so on, as other unit of data transmission.

Reception apparatus 200 receives a packet transmitted by transmission apparatus 100, and performs demodulation and error correction decoding processing, and further performs error detection processing on the decoding output. In a case where no error is detected on the decoding output in the error detection, reception apparatus 200 transmits a reception acknowledgement signal (Positive Acknowledgment: hereafter referred to as "ACK") to transmission apparatus 100. In a case where an error is detected on the decoding output, reception apparatus 200 transmits a retransmission request signal (Negative Acknowledgment: hereafter referred to as "NACK") to transmission apparatus 100.

Receiving the NACK, transmission apparatus 100 generates a retransmission packet by multiplexing a data sequence identical to one in the last transmission unit and a protocol header, and transmits the generated retransmission packet to reception apparatus 200. Upon reception of the retransmission packet, reception apparatus 200 combines (performs power combination processing on) the received packet with previous packets received in the last transmission unit and therebefore. Decoding is then performed on the combined sequence. The decoding output is subjected to error detection processing, and depending on the result of the error detection, either an ACK or a NACK is transmitted to transmission apparatus 100. In a case where a NACK is received, transmission apparatus generates and transmits a new retransmission packet. Transmission apparatus 100 repeats retransmission until an ACK is received, and starts the transmission of a next packet upon reception of an ACK.

It is noted that, in this specification, a series of processing from the transmission of a packet by transmission apparatus 100 through the return transmission of an ACK or a NACK from reception apparatus 200 which receives the transmitted packet to transmission apparatus 100, and reaching thereof, is referred to as a "retransmission unit." In addition, a set of processing from the transmission of the identical packet in its k-th attempt from the transmission side through the reception of an ACK or a NACK transmitted in return is referred to as "k-th retransmission unit." It is noted that a case of transmitting a new non-transmitted packet ($1^{st}$ transmission) is referred to as "$1^{st}$ retransmission unit."

Next, a detailed explanation is given here regarding transmission apparatus 100 and reception apparatus 200 described above.

Figure 2:
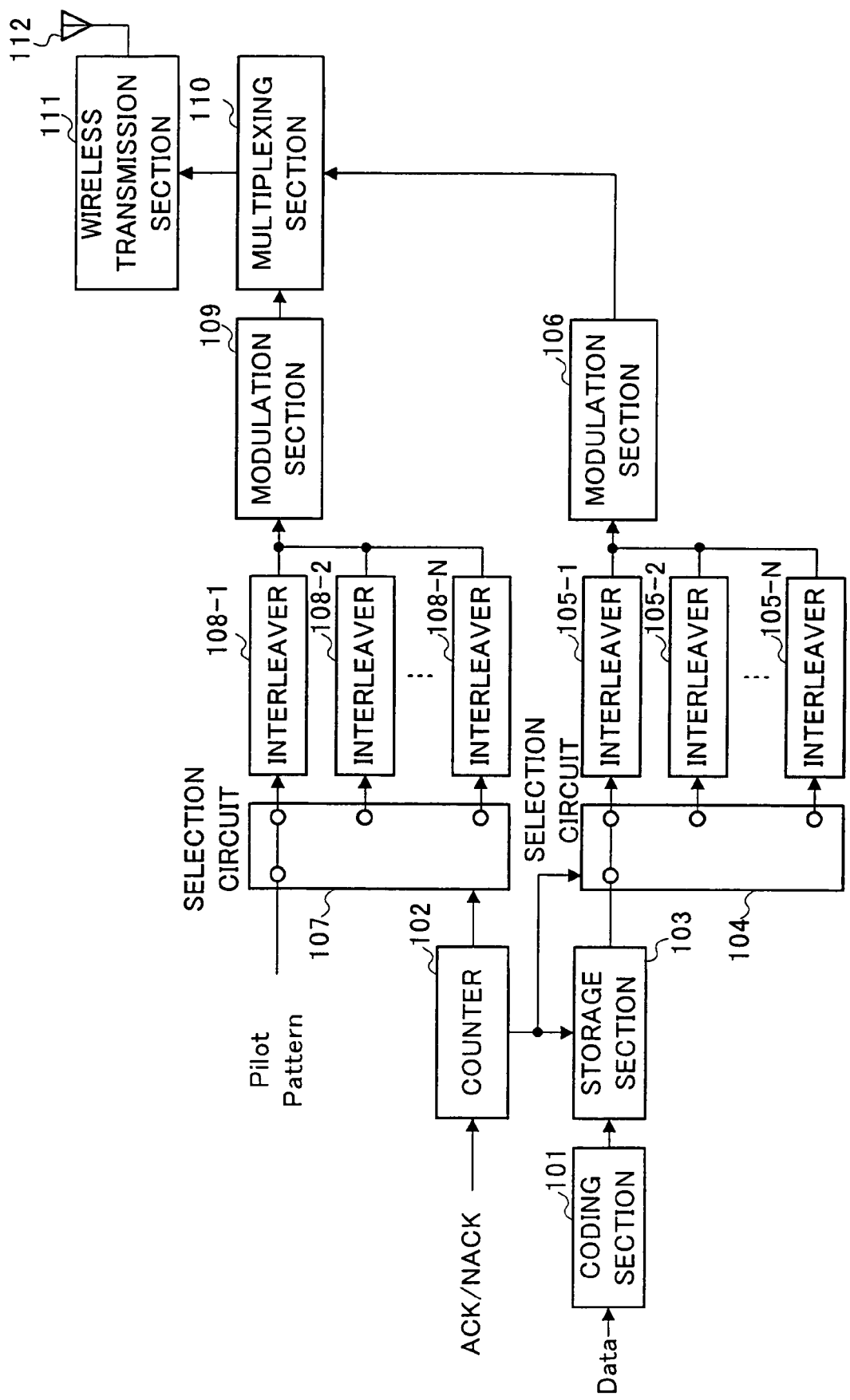
FIG. 2 is a block diagram illustrating the inner configuration of a transmission apparatus according to an embodiment of the present invention.

First, an explanation is given on transmission apparatus 100. FIG. 2 is a block diagram illustrating the inner configuration of transmission apparatus 100. In this figure, coding section 101 performs error detection coding on, and then error correction coding on information bits, and outputs the coded signal to storage section 103. Counter 102 keeps count of the number of transmission times of an identical packet, and outputs the counted value to storage section 103, selection circuits 104 and 107. In addition, counter 102 resets its counter value upon reception of an ACK from reception apparatus 200, and starts counting from 1. Storage section 103 stores the coded signal, and changes output data in accordance with a counter value outputted from counter 102. That is, the section 103 outputs new non-transmitted data in a case of a counter value "1", whereas the same section outputs data identical to the last output in a case of a counter value "2" and over. In accordance with the counter value outputted from counter 102, that is, in accordance with the number of transmission times of the identical packet, selection circuit 104 selects one interleaver out of interleavers 105-1~105-N, and establishes a connection between storage section 103 and the selected interleaver.

Each individual interleave pattern different from others is assigned to each of interleavers 105-1~105-N in a predetermined manner, where a new interleaver which is different from previous ones is employed at each time of an increase in the number of transmission times of the identical packet. At the interleaver selected by selection circuit 104, the order of sequence in data is re-arranged in accordance with a predetermined rule (interleave pattern), and the re-arranged data is outputted to modulation section 106.

With a modulation scheme such as QPSK, 16 QAM, and so on set in advance, modulation section 106 performs a predetermined modulation processing on the signal after being subjected to interleaving by either one of interleavers 105-1~105-N, and outputs the modulated signal to multiplexing section 110. In accordance with the counter value outputted from counter 102, that is, in accordance with the number of transmission times of the identical packet, selection circuit 107 selects one interleaver out of interleavers 108-1~108-N, and outputs a pilot pattern inputted therein to the selected interleaver.

Each individual interleave pattern different from others is assigned to each of interleavers 108-1~108-N in a predetermined manner, where a new interleaver which is different from ones used for previous retransmissions is employed at each time of an increase in the number of retransmission times. At the interleaver selected by selection circuit 107, the order of sequence in data is re-arranged in accordance with a predetermined rule (interleave pattern), and the re-arranged data is outputted to modulation section 109. It is noted that the interleave patterns discussed here are not necessarily identical in pattern to those of interleavers 105-1~105-N.

Modulation section 109 modulates the signal interleaved by either one of interleavers 108-1~108-N, and outputs the modulated signal to multiplexing section 110. Multiplexing section 110 performs multiplexing of a data signal outputted from modulation section 106, a pilot signal outputted from modulation section 109, and a protocol header to generate a transmission packet, and outputs the generated transmission packet to wireless transmission section 111. Wireless transmission section 111 performs a predetermined transmission processing such as frequency conversion processing, amplification processing, and so on, and then transmits the transmission-processed signal to reception apparatus 200 via antenna 112.

Figure 3:
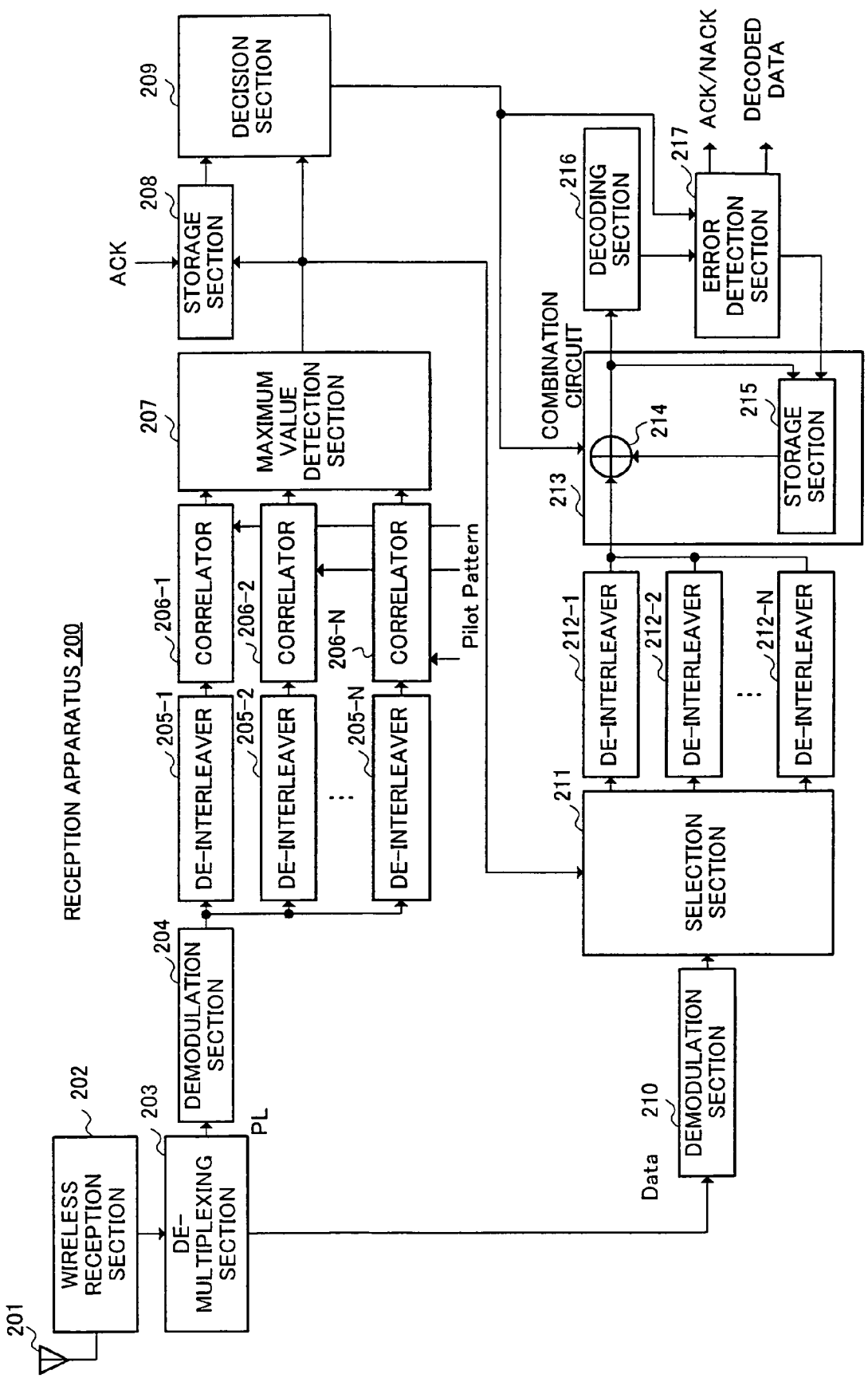
FIG. 3 is a block diagram illustrating the inner configuration of a reception apparatus according to an embodiment of the present invention.

Next, an explanation is given here on reception apparatus 200. FIG. 3 is a block diagram illustrating the inner configuration of reception apparatus 200. Wireless reception section 202 performs a predetermined reception processing such as frequency conversion processing on a packet received via antenna 201, and outputs the packet after being subjected to the reception processing to de-multiplexing section 203. De-multiplexing section 203 de-multiplexes the received packet into a pilot sequence and a data sequence. The pilot sequence subjected to the de-multiplexing is outputted to demodulation section 204, whereas the data sequence subjected to the de-multiplexing is outputted to demodulation section 210.

Demodulation section 204 performs demodulation processing on the de-multiplexed pilot sequence, and outputs the demodulated pilot sequence to all of de-interleavers 205-1~205-N.

Provided with interleave patterns each of which corresponds individually to a counterpart of interleave patterns of interleavers 108-1~108-N in a one-to-one relationship, de-interleavers 205-1~205-N performs de-interleave processing on the demodulated pilot sequence with individual interleave patterns. Each signal subjected to the de-interleaving is outputted to one of correlators 206-1~206-N.

Correlators 206-1~206-N performs correlation calculation between the de-interleaved pilot sequence and a known pilot sequence, and outputs a correlation value, which is the output of the correlation calculation, to maximum value detection section 207. Regarding the known pilot sequence, an identical pattern is predetermined between transmission apparatus 100 and reception apparatus 200.

Maximum value detection section 207 detects the maximum correlation value among the correlation values outputted from correlators 206-1~206-N. The section 207 then determines as to which number of transmission attempts the current retransmission unit is in, where such a determination is rendered based on the interleave pattern corresponding to the detected maximum correlation value. The determined number of times of transmission for the retransmission unit is outputted to storage section 208, decision section 209, and selection section 211. Retaining the last number of transmission times for the retransmission unit, storage section 208 outputs the stored information to decision section 209 upon output of the determined number of times for the retransmission unit from maximum value detection section 207. In addition, the section 208 overwrites its stored information with the determined number of times for the retransmission unit outputted from maximum value detection section 207, and stores the overwritten information. It is noted that how specifically such a determination of the number of times for the retransmission unit is made will be described later.

Decision section 209 makes a decision as to whether the currently-transmitted packet is the packet demanded by reception apparatus 200, where such a decision is made based on the last number of transmission times for the retransmission unit outputted from storage section 208 and the current number of transmission times for the retransmission unit outputted from maximum value detection section 207. The decision result is outputted to combination circuit 213 and error detection section 217.

Demodulation section 210 performs demodulation processing on the de-multiplexed data sequence, and outputs the demodulated data sequence to selection section 211. In accordance with the current number of transmission times for the retransmission unit outputted from maximum value detection section 207, selection section 211 selects one de-interleaver out of de-interleavers 212-1~212-N, and outputs the data sequence to the selected de-interleaver among de-interleavers 212-1~212-N.

De-interleavers 212-1~212-N are provided with interleave patterns each of which corresponds individually to a counterpart of interleave patterns of interleavers 105-1~105-N in a one-to-one relationship. De-interleavers 212-1~212-N perform de-interleaving processing on the data sequence outputted to the deinterleaver selected by selection section 211, and the selected de-interleaver outputs the de-interleaved signal to combination circuit 213. Combination circuit 213 is provided with adder 214 and storage section 215, where adder 214 combines the data sequence received in the current retransmission unit and the combination data of the data sequence in previous receptions. In addition to overwriting storage section 215 with the combined data, adder 214 outputs the combined data to decoding section 216. At each time of repeating retransmission, the combined data goes through overwriting process so that storage section 215 retains overwritten data. Accordingly, storage section 215 retains all-combined data in which the data sequence received in the current retransmission unit and previous ones up to the current one are all combined. It is noted that, in a case where a discard signal is received from decision section 209 or in a case where an ACK is received from error detection section 217, the section 215 erases combination data held therein.

Decoding section 216 performs error correction decoding processing on the symbol subjected to the combination, which is outputted from combination circuit 213, and provides the decoding output to error detection section 217. Error detection section 217 performs error detection on the signal outputted from decoding section 216, and generates a NACK if an error is detected and generates an ACK if no error is detected therein. Either an ACK or a NACK generated thereat is transmitted to transmission apparatus 100. If it is an ACK, it is also outputted to storage sections 208 and 215 of reception apparatus 200.

Next, an explanation for the operation of transmission apparatus 100 and receiving apparatus 200 is given here regarding a case where, though reception apparatus 200 has transmitted a NACK, the transmitted message is mis-received as an ACK by transmission apparatus 100. Upon detection of an error in packet M received in the k-1th retransmission unit at error detection section 217, reception apparatus 200 generates a NACK. Reception apparatus 200 then transmits the generated NACK to transmission apparatus 100. Due to effects of fading, etc., in air on its propagation path, it is assumed here that the transmitted NACK is erroneously recognized as an ACK when received by transmission apparatus 100. Such an incorrect recognition of ACK reception misleads transmission apparatus 100 into resetting counter 102 and starting transmission processing of packet M+1.

Each of interleavers 105-1~105-N has each individual interleave pattern corresponding to each number of times for its retransmission unit; for example, interleaver 105-1 corresponds to the $1^{st}$ retransmission unit, with interleavers 105-2 and 105-N corresponding to the $2^{nd}$ retransmission unit and the Nth retransmission unit, respectively. Therefore, in accordance with the counter value (the number of times of transmission for a retransmission unit) "1" indicated by counter 102, selection circuit 104 selects interleaver 105-1 to make connections between the selected interleaver 105-1 and storage section 103. The data sequence outputted from storage section 103 is subjected to interleaving at interleaver 105-1, and the interleaved data sequence goes through modulation section 106 to be outputted to multiplexing section 110.

Each of interleavers 108-1~108-N has also each individual interleave pattern corresponding to each number of times for its retransmission unit; for example, interleaver 108-1 corresponds to the $1^{st}$ retransmission unit, with interleavers 108-2 and 108-N corresponding to the $2^{nd}$ retransmission unit and the Nth retransmission unit, respectively.

In the same manner as done by selection circuit 104, in accordance with the number of times of transmission for the retransmission unit "1" indicated by counter 102, selection circuit 107 selects interleaver 108-1, and the pilot sequence is outputted to the selected interleaver 108-1. The pilot sequence is subjected to interleaving at interleaver 108-1, and the interleaved pilot sequence goes through modulation section 109 to be outputted to multiplexing section 110.

At multiplexing section 110, the multiplexing of the modulated data sequence, the modulated pilot sequence, and a protocol header is performed, and the multiplex output goes through wireless transmission section 111 and then antenna 112 to be transmitted to reception apparatus 200.

The packet M+1 transmitted from transmission apparatus 100 is received at reception apparatus 200. The received packet is de-multiplexed into a pilot sequence and a data sequence at de-multiplexing section 203. The de-multiplexed pilot sequence is subjected to demodulating processing at demodulation section 204, and then de-interleaving processing at all of de-interleavers 205-1~205-N. The de-interleaved pilot sequence subjected to de-interleaving processing at all of de-interleavers 205-1~205-N is further subjected to correlation calculation between the de-interleaved pilot sequence itself and a known pilot pattern at correlators 206-1~206-N, and the calculated correlation value is outputted to maximum value detection section 207. At maximum value detection section 207, the maximum correlation value is detected among the correlation values outputted from correlators 206-1~206-N. In such a detection, because the interleave pattern of interleaver 108-1 is used at the transmission side, it follows that the pilot sequence outputted from de-interleaver 205-1 should take the maximum correlation value. In other words, at maximum value detection section 207, it is possible to identify which interleave pattern the packet M+1 transmitted from transmission apparatus 100 is interleaved with, and the section 207 determines that the current packet is the $1^{st}$ retransmission unit packet based on the number of times of transmission for the retransmission unit corresponding to the identified interleave pattern. The number of times of transmission for the retransmission unit "1" determined at maximum value detection section 207 is outputted to storage section 208, decision section 209, and selection section 211.

Storage section 208 notifies the number of times of transmission for the retransmission unit "k−1" in its memory to decision section 209. In addition, the section 208 overwrites its stored information with new information, that is, the determined number of times for the retransmission unit "1" outputted from maximum value detection section 207, and stores the overwritten information.

Selection section 211 selects de-interleaver 212-1 corresponding to the determined number of times for the retransmission unit "1" outputted from maximum value detection section 207, and the data sequence of the packet M+1 is outputted to the selected de-interleaver 212-1. The data sequence inputted into de-interleaver 212-1 is subjected to de-interleaving, and the de-interleaved data sequence is outputted to combination circuit 213.

Decision section 209 makes a decision as to whether the currently-transmitted packet is the packet demanded by the reception apparatus, where such a decision is made based on the number of transmission times for the retransmission unit notified from storage section 208 and the number of transmission times for the retransmission unit determined at maximum value detection section 207. Because the number of transmission times for the retransmission unit notified from storage section 208 is "k−1", the packet demanded by reception apparatus 200 is the k-th retransmission unit packet. However, because the number of transmission times for the retransmission unit determined at maximum value detection section 207 is "1" (which indicates the $1^{st}$ retransmission unit for the first attempt of transmission), it is determined that the currently-transmitted packet is not what reception apparatus 200 demands. Based on such a determination result, decision section 209 instructs combination circuit 213 to discard its combination data up to the k−1th retransmission unit stored in storage section 215. At combination circuit 213, because there is no data which should be combined with the data sequence of the packet M+1 outputted from de-interleaver 212-1, the data sequence of the packet M+1 is outputted to decoding section 216 without any combination.

In this way, it is possible to avoid the data sequence of the packet M+1 in the $1^{st}$ retransmission unit from being combined with the combination data of the packet M up to the k−1th retransmission unit even in a case where reception apparatus 200 receives the packet M+1, which is a different packet from what the apparatus 200 demands, that is, the packet M. In other words, if the packet M+1 transmitted in error is combined with the packet M, there is a possibility that the decoding of both of the packets fails; in contrast, performing the above-described processing makes it possible to decode the packet M+1 in the $1^{st}$ retransmission unit, which is transmitted due to mis-recognition, thereby preventing throughput from decreasing.

Incidentally, though the combination data of the packet M up to the k−1th retransmission unit retained by reception apparatus 200 is discarded, an upper layer supports retransmission processing. In addition, another configuration is conceivable, in which reception apparatus 200 sends a notification to transmission apparatus 100 for returning to the packet M retransmission unit. With such a configuration, it is possible to reduce the number of discarded packets, thereby preventing throughput from decreasing.

Next, an explanation for the operation of transmission apparatus 100 and receiving apparatus 200 is given here regarding a case where, though reception apparatus 200 has transmitted an ACK, the transmitted message is mis-received as a NACK by transmission apparatus 100. Upon detection of no error in received packet M at error detection section 217, reception apparatus 200 generates an ACK. Reception apparatus 200 then transmits the generated ACK to transmission apparatus 100. Due to effects of fading, etc., in air on its propagation path, it is assumed here that the transmitted ACK is erroneously recognized as a NACK when received by transmission apparatus 100. Such an incorrect recognition of NACK reception misleads transmission apparatus 100 into incrementing counter 102 by one and retransmitting the packet M. The retransmission unit in such erroneous retransmission is assumed to be the kth retransmission unit (where k≠1).

Transmission apparatus 100 performs interleaving processing on a pilot sequence which is to be multiplexed into the packet M using interleaver 108-k corresponding to the kth retransmission unit. In the same manner, transmission apparatus 100 performs interleaving processing on a data sequence which is to be multiplexed into the packet M using interleaver 105-k corresponding to the kth retransmission unit. The packet M in the kth retransmission unit after being subjected to interleaving in this way is transmitted to reception apparatus 200.

The packet M transmitted from transmission apparatus 100 is received at reception apparatus 200. The pilot sequence of the received packet M is subjected to de-interleaving processing at all of de-interleavers 205-1~205-N. The de-interleaved pilot sequence subjected to de-interleaving processing at all of de-interleavers 205-1~205-N is further subjected to correlation calculation between the de-interleaved pilot sequence itself and a known pilot sequence at correlators 206-1~206-N, and the calculated correlation value is outputted to maximum value detection section 207. At maximum value detection section 207, the maximum correlation value is detected among the correlation values outputted from correlators 206-1~206-N. In such a detection, because the interleave pattern of interleaver 108-k is used at the transmission side, it follows that the pilot sequence outputted from de-interleaver 205-k should take the maximum correlation value. In other words, maximum value detection section 207 determines that the current packet M transmitted from transmission apparatus 100 is the k-th retransmission unit packet. The number of times of transmission for the retransmission unit "k" determined at maximum value detection section 207 is outputted to storage section 208, decision section 209, and selection section 211.

As the ACK has already been received from error detection section 217, storage section 208 retains its storage data "0", and the number of times of transmission for the retransmission unit "0" is notified to decision section 209. In addition, the section 208 overwrites its stored data with new data, that is, the determined number of times for the retransmission unit "k" outputted from maximum value detection section 207, and stores the overwritten data. Selection section 211 selects de-interleaver 212-k corresponding to the determined number of times for the retransmission unit "k" outputted from maximum value detection section 207, and the data sequence of the packet M is outputted to the selected de-interleaver 212-k. The data sequence inputted into de-interleaver 212-k is subjected to de-interleaving, and the de-interleaved data sequence is outputted to combination circuit 213.

Decision section 209 makes a decision as to whether the currently-transmitted packet is the packet demanded by the reception apparatus, where such a decision is made based on the number of transmission times for the retransmission unit notified from storage section 208 and the number of transmission times for the retransmission unit determined at maximum value detection section 207. Because the number of transmission times for the retransmission unit notified from storage section 208 is "0", the packet demanded by reception apparatus 200 is the $1^{st}$ retransmission unit packet. However, because the number of transmission times for the retransmission unit determined at maximum value detection section 207 is "k" (which indicates retransmission), it is determined that the currently-transmitted packet is not what reception apparatus 200 demands. Based on such a determination, decision section 209 instructs combination circuit 213 not to output the data sequence of the packet M to decoding section 216, and also instructs error detection section 217 to generate an ACK for the packet M again.

At combination circuit 213, as storage section 215 has already received the ACK, there is no stored combination data, and accordingly, no combination is done on the data sequence of the packet M at adder 214. In addition, because combination circuit 213 is under instructions from decision section 209 not to output the data sequence of the packet M to decoding section 216, the data sequence outputted from adder 214 goes to storage section 214 only.

Under instructions from decision section 209, error detection section 217 generates an ACK again, and, in addition to transmitting the generated ACK to transmission apparatus 100, the section 217 outputs the generated ACK to storage sections 208 and 215. Receiving the ACK, transmission apparatus 100 starts the transmission processing of the next packet M+1, which has not yet been transmitted. On the other hand, at reception apparatus 200, the stored number of times of transmission for the retransmission unit "k" is reset upon the reception of the ACK at storage section 208, whereas the data sequence of the packet M transmitted due to mis-recognition is erased upon the reception of the ACK at storage section 215.

In this way, even in a case where the retransmission packet of the packet M is received despite the fact that the packet demanded by reception apparatus 200 is actually the packet M+1 in the $1^{st}$ retransmission unit, the data sequence of the packet M is discarded without being subjected to decoding, which makes it possible to avoid decoding the data of the packet M, which has already been successfully decoded without errors detected thereon, again. This helps avoid throughput from being decreased.

Figure 4:
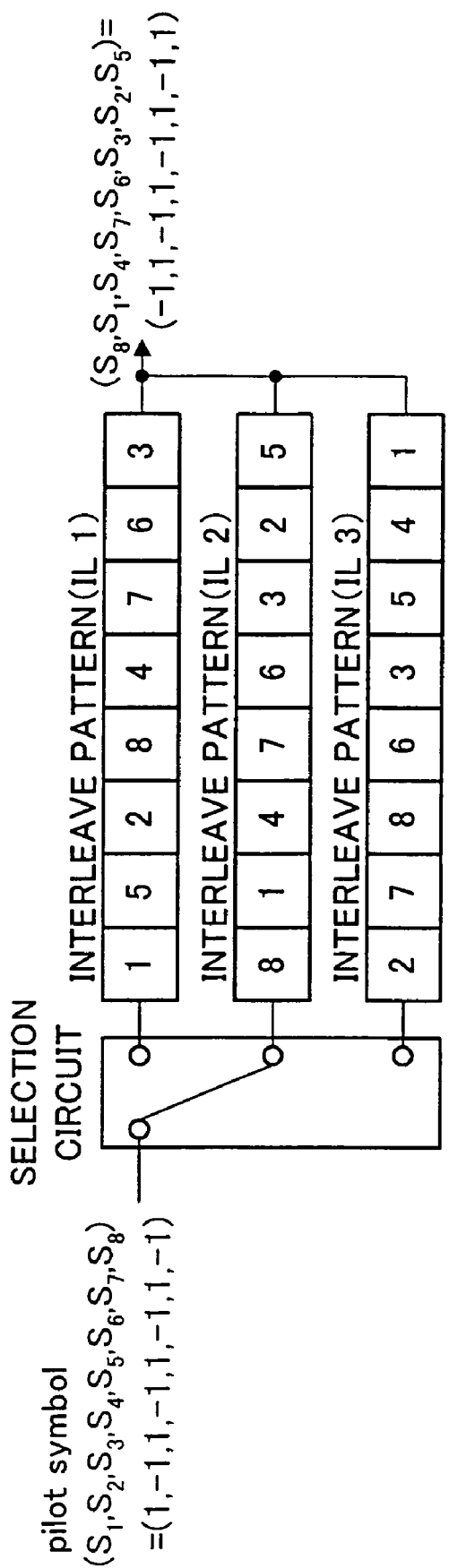
FIG. 4 is a schematic diagram illustrating interleaving processing for each number of times of a retransmission unit according to an embodiment of the present invention.

Next, a detailed explanation is given here as to how the number of times of transmission for the retransmission unit is judged using a pilot sequence. FIG. 4 is a schematic diagram illustrating interleaving processing for each number of times of a retransmission unit according to an embodiment of the present invention. In FIG. 4, it is assumed that a pilot sequence consists of 8 symbols, and that a symbol sequence (denoted as P) is made up of $P=(S_1, S_2, S_3, S_4, S_5, S_6, S_7, S_8)=(1, -1, 1, -1, 1, -1, 1, -1)$. In addition, it is further assumed that an interleave pattern applied to the $1^{st}$ retransmission unit is IL1=(1, 5, 2, 8, 4, 7, 6, 3). Through interleaving processing with the IL1, the symbol sequence inputted in the order of $S_1 \sim S_8$ is rearranged in the order of $S_1, S_5, S_2, S_8, S_4, S_7, S_6, S_3$ and the rearranged sequence is outputted. In the same manner, an interleave pattern applied to the $2^{nd}$ retransmission unit is assumed to be IL2 =(8, 1, 4, 7, 6, 3, 2, 5), whereas an interleave pattern applied to the $3^{rd}$ retransmission unit is assumed to be IL3=(2, 7, 8, 6, 3, 5, 4, 1). Here, an explanation is given on the $2^{nd}$ retransmission unit.

Figure 5:
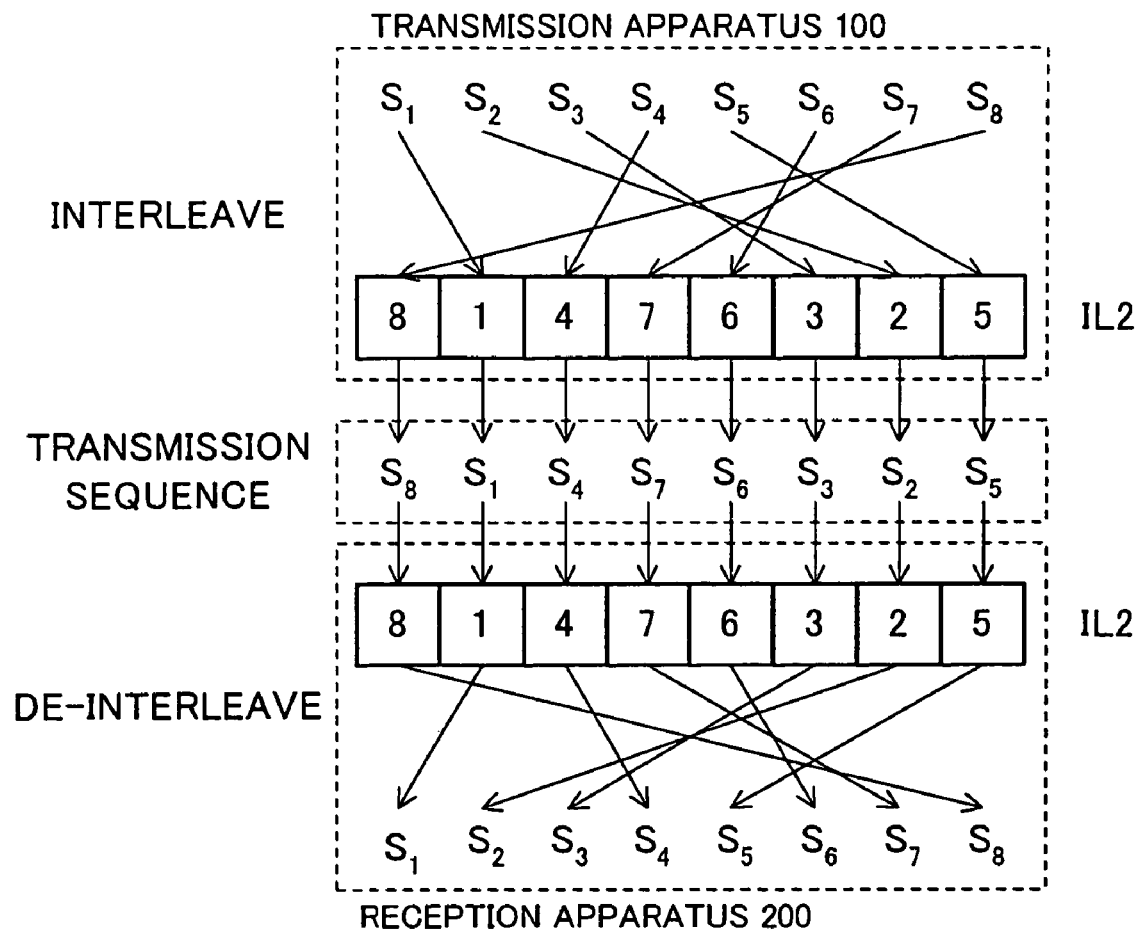
FIG. 5 is a diagram illustrating interleaving and de-interleaving processing according to an embodiment of the present invention.

At transmission apparatus 100, counter 102 indicates "2", and selection circuit 107 selects IL2 corresponding to the $2^{nd}$ retransmission unit. The pilot sequence is subjected to interleaving with IL2 of interleaver 108-2. Interleaving and de-interleaving processing using IL2 is explained here with reference to FIG. 5. As illustrated in this figure, the order of sequence in the pilot sequence before being subjected to interleaving is rearranged through the interleaving in accordance with the pattern indicated by IL2, and the order of sequence in the pilot sequence after the interleaving will be the order of sequence indicated by IL2. More specifically, because the $1^{st}$ component of IL2 is 8, the eighth in the pilot sequence before interleaving, which is $S_8$, should be the first after interleaving, whereas the $2^{nd}$ component of IL2 is 1, therefore the first in the pilot sequence before interleaving, which is $S_1$, should be the second after interleaving. In this manner, arrangement in the order of sequence is performed on all in the pilot sequence. Consequently, the rearranged pilot sequence after interleaving (denoted as P'), $P'=(S_8, S_1, S_4, S_7, S_6, S_3, S_2, S_5)$, is transmitted to reception apparatus 200.

In de-interleaving at reception apparatus 200, the interleaved sequence P' is subjected to processing to get it back to its original order of sequence P before interleaving. That is, the order of sequence in the pilot sequence after interleaving is in a rearranged order as indicated by IL2. More specifically, the $1^{st}$ component in the interleaved symbol sequence P', $S_8$, is rearranged to the order indicated by the $1^{st}$ component in IL2 (8). In the same manner, the $2^{nd}$ component in the interleaved symbol sequence P', $S_1$, is rearranged to the order indicated by the $2^{nd}$ component in IL2 (1). In this way, it is possible to get the interleaved pilot sequence P' back to its original pilot sequence P before interleaving by performing rearrangement on all in the interleaved pilot sequence.

Figure 6:
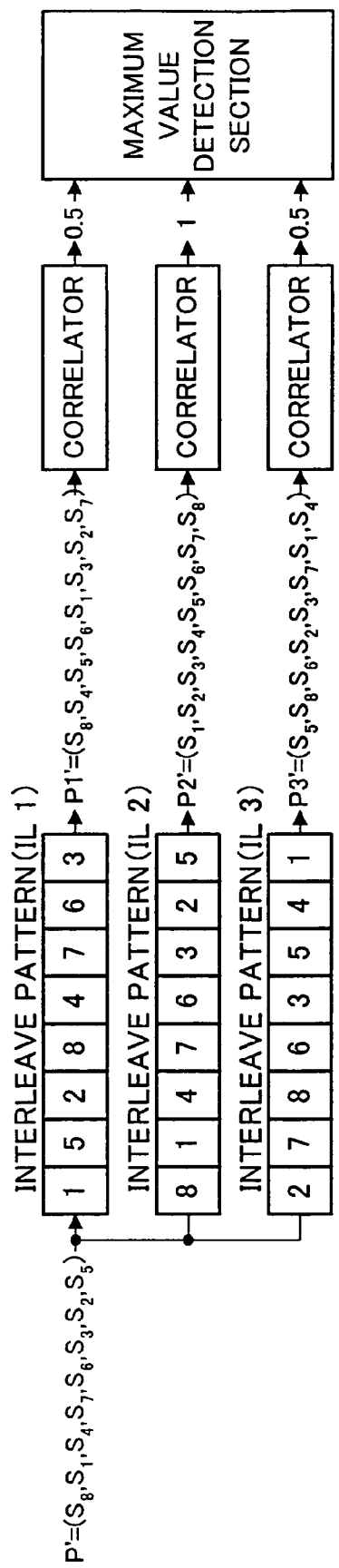
FIG. 6 is a schematic diagram illustrating de-interleaving processing for each number of times of a retransmission unit according to an embodiment of the present invention.

In this embodiment, the interleaved pilot sequence P' is subjected to de-interleaving with all interleave patterns. This is illustrated in FIG. 6. In FIG. 6, interleave patterns IL1~IL3 shown in FIG. 4 are illustrated, where P' is rearranged with IL1~IL3 in accordance with the above-described de-interleaving processing. Going through de-interleaving processing using IL1, $P'=(S_8, S_1, S_4, S_7, S_6, S_3, S_2, S_5)$ will be rearranged to $(S_8, S_4, S_5, S_6, S_1, S_3, S_2, S_7)$. In the same way, going through de-interleaving processing using IL2, P2' will be $(S_1, S_2, S_3, S_4, S_5, S_6, S_7, S_8)$, whereas P3' will be $(S_5, S_8, S_6, S_2, S_3, S_7, S_1, S_4)$ after going through the de-interleaving with IL3. The result of such de-interleaving indicates $P \neq P1'$, $P=P2'$, $P \neq P3'$, which signifies that it is possible to get the original same sequence as the sequence of a transmission side only in a case where a reception apparatus performs de-interleaving processing using an interleave pattern which is the same as one used for interleaving. Practically, correlation with a known pilot pattern is calculated at correlators, and a pilot sequence detected as indicating the maximum correlation value is recognized as the same sequence as that of the transmission side.

Here, an explanation is given as to how a judgment is made using correlators. A pilot sequence gets affected by distortion due to noise in a propagation path, where in such a condition, it is possible to calculate correlation values with high accuracy by performing a correlation operation in accordance with the following equation (1).

$$C_m = \frac{1}{N} \sum_{i=1}^{N} (p'_{m,i} \times p_i) \qquad \text{Equation (1)}$$

where $C_m$ represents an output from a correlator connected to a de-interleaver corresponding to the m-th retransmission unit, N represents the length of a pilot sequence, and $p'_{m,i}$ represents the i-th component of the pilot sequence de-interleaved with the de-interleaver corresponding to the m-th retransmission unit, whereas the i-th component in a known pilot sequence is denoted as $p_i$. FIG. 6 shows the operation result of such correlation values calculated in accordance with the above equation. The known pilot pattern here is $(S_1, S_2, S_3, S_4, S_5, S_6, S_7, S_8)$. In addition, $S_1 \sim S_8$ take the same values as illustrated in FIG. 4. The correlation value between the pilot sequence de-interleaved with IL1 and the known pilot pattern, and that with IL3, indicate the value of 0.5. The correlation value between the pilot sequence de-interleaved with IL2 and the known pilot pattern indicates the value of 1, which is the maximum correlation value.

It is noted that, in this embodiment, though a regular pattern of $P=(1, -1, 1, -1, 1, -1, 1, -1)$ is used as a pilot pattern for simplification of an explanation, it is preferable to use a sequence which features a small cross-correlation with other sequences such as a maximum-length linear shift-register sequence or a Gold sequence in order to get a small correlation value when de-interleaving is performed at a reception side with an interleave pattern which is different from one used at a transmission side. In addition, though it is assumed that the length of sequence is 8 in the above description, it is preferable to adopt such a length of sequence as one which ensures a small correlation value for a case where interleave patterns different from each other is employed. Further in addition, the interleave scheme and the de-interleave scheme described above is just one example, and there are other schemes for performing rearrangement in a pre-specified rule.

Moreover, in this embodiment, description relates to bit-interleaving, where interleaving processing is performed at a processing stage prior to modulation at modulation sections 106 and 109 at transmission apparatus 100 whereas de-interleaving processing is performed at a processing stage after demodulation at demodulation sections 204 and 210 at reception apparatus 200; however, it is also possible to apply the present invention to symbol-interleaving, where interleaving processing is performed at a processing stage after modulation at modulation sections 106 and 109 at transmission apparatus 100 whereas de-interleaving processing is performed at a processing stage prior to demodulation at demodulation sections 204 and 210 at reception apparatus 200. In a case where interleaving and de-interleaving is performed on modulation symbols, the amount of data which should be subjected to interleaving decreases, which helps reduce processing load.

Furthermore, though it is explained in this embodiment regarding a case where bit-interleaving is applied both for pilot and data, it is not necessarily that the same interleaving scheme is applied in all cases; for example, it is possible to adopt a configuration in which symbol-interleaving is used for pilot, while bit-interleaving is used for data.

Still furthermore, in a CDMA (Code Division Multiple Access) system in which spreading processing is performed at a processing stage after modulation at modulation sections 106 and 109 at transmission apparatus 100 whereas de-spreading processing is performed at a processing stage prior to demodulation at demodulation sections 204 and 210 at reception apparatus 200, it is possible to adopt a configuration in which interleaving and de-interleaving is applied to chips after spreading.

With such a configuration, a pilot pattern is subjected to interleaving using a different interleave pattern for each retransmission unit and is transmitted thereafter, which allows the reception side to know the current number of times of transmission for the retransmission unit, making it possible to combine the same packet only. In addition, there is no need to separately transmit the number of times of transmission for the retransmission unit subjected to error correction, nor is it necessary to perform decoding processing thereof, and therefore, it is possible to significantly decrease the amount of processing load at a reception apparatus without causing any processing delay. As a consequence of all the above, it is possible to increase throughput.

It is possible to apply a data transmission system according to the present embodiment to a digital wireless cellular system. In such an application, reception apparatus 200 is mounted in a communications terminal moving freely in a cell, while transmission apparatus 100 is installed in a base station. Transmission apparatus 100 and reception apparatus 200 performs ARQ processing between them, which enables the quality of transmission in wireless communications to improve, and throughput to be increased. It is noted that, alternatively, reception apparatus 200 may be installed in a base station, while transmission apparatus 100 may be mounted in a communications terminal.

Incidentally, in this embodiment, the first transmission and retransmissions thereafter are collectively referred to as "the number of times of transmission for the retransmission unit," however, this term is stated in CLAIMS as "number of times of retransmission." These terms have the same meaning.

As described above, according to the present invention, a plurality of interleave patterns each of which corresponds to each number of transmission times for an identical packet are made known between a transmission apparatus and a reception apparatus, and the reception apparatus knows the number of transmission times for the received packet based on the interleave pattern, which allows the reception apparatus to judge whether the received packet is demanded one or not without performing any decoding processing, thereby reducing both processing load and processing delay. In addition, in a case where the received packet is not what is demanded by the reception apparatus, combination of the received packet with combination data of previous transmissions and decoding thereof is avoided, which makes it possible to further avoid a decrease in throughput even when the reception apparatus receives a packet different from expected one.

This specification is based on the Japanese Patent Application No. 2002-070866 filed on Mar. 14, 2002, entire content of which is expressly incorporated by reference herein.

INDUSTRIAL APPLICABILITY

The present invention is suitably applicable to a reception apparatus and a reception method for performing an error control in data transmission with the issuance of an automatic repeat request.

The invention claimed is:

1. A reception apparatus comprising:
   a reception section that receives a signal transmitted with an interleave pattern corresponding to a number of times of retransmission, the pattern being determined in advance between the reception apparatus and a transmitting side;
   a de-interleaver that performs de-interleaving on the signal received by said reception section using a plurality of interleave patterns corresponding to numbers of times of retransmission to form a plurality of de-interleaved signals;
   a correlation value calculation section that calculates a correlation value between each of the plurality of de-interleaved signals and a known reference signal; and
   a maximum value detection section that detects the maximum correlation value out of a plurality of correlation values calculated by said correlation value calculation section and determines the received signal's number of times of retransmission based on the interleave pattern which has formed the de-interleaved signal for which the maximum correlation value is obtained.

2. The reception apparatus according to claim 1, further comprising:
   a combination decoding section that, when data sequences of previous receptions include the same data sequence as a data sequence of a current reception, combines the data sequence of the current reception with combination data of the data sequences of the previous receptions and decodes the combined data;
   an error detection section that performs error detection on the decoded combined data, generates a retransmission request signal upon detecting an error in the decoded combined data, and generates a receipt acknowledgment signal upon detecting no error; and
   a combination decoding control section that controls the processing by said combination decoding section, in a first case where the retransmission request signal is generated by said error detection section and the maximum value detection section determines the received signal is a first transmission of the signal, and in a second case where the receipt acknowledgment signal is generated by said error detection section and the maximum value detection section determines the received signal is a retransmission of the signal.

3. The reception apparatus according to claim 2, wherein said combination decoding control section controls said combination decoding section not to combine the combination data of the data sequences of previous receptions with the data sequence of the current reception in the first case, and controls said combination decoding section not to decode the data sequence of the current reception in the second case.

4. A system having a reception apparatus and a transmission apparatus that transmits a signal to the reception apparatus, said reception apparatus comprising:
- a reception section that receives a signal transmitted with an interleave pattern corresponding to a number of times of retransmission, the pattern being determined in advance between the reception apparatus and a transmitting side;
- a de-interleaver that performs de-interleaving on the signal received by said reception section using a plurality of interleave patterns corresponding to numbers of times of retransmission to form a plurality of de-interleaved signals;
- a correlation value calculation section that calculates a correlation value between each of the plurality of de-interleaved signals and a known reference signal; and
- a maximum value detection section that detects the maximum correlation value out of a plurality of correlation values calculated by said correlation value calculation section and determines the received signal's number of times of retransmission based on the interleave pattern which has formed the de-interleaved signal for which the maximum correlation value is obtained, and said transmission apparatus comprising:
- an interleaver that has a plurality of interleave patterns corresponding to numbers of times of retransmission and performs interleaving on a transmission signal with the interleaver pattern corresponding to the applicable number of times of retransmission; and
- a transmission section that transmits the interleaved transmission signal to the reception apparatus.

5. A reception method comprising:
(a) deinterleaving a received signal with interleave patterns corresponding to numbers of times of retransmission predetermined with a transmission side to form a plurality of de-interleaved signals;
(b) calculating a correlation value between each of the plurality of de-interleaved signals and a known reference signal; and
(c) detecting the maximum correlation value out of a plurality of correlation values calculated in step (b) and determining the received signal's number of times of retransmission based on the interleave pattern which has formed the de-interleaved signal for which the maximum correlation value is obtained.

6. The reception method according to claim 5, further comprising:
(d) when data sequences of previous receptions include the same data sequence as a data sequence of a current reception, combining the data sequence of the current reception with combination data of the data sequences of the previous receptions and decoding the combined data;
(e) determining whether or not the number of times of retransmission of the data sequence of the current reception matches the number of the times of retransmission detected in step (c) based on an error detection result of the data sequences of the previous receptions; and
(f) controlling step (d) not to decode the data sequence of the current reception when the determination result does not match in step (e).

* * * * *